April 30, 1935.  E. LAFOND ET AL  1,999,702
FISHING NET FLOAT
Filed April 7, 1934
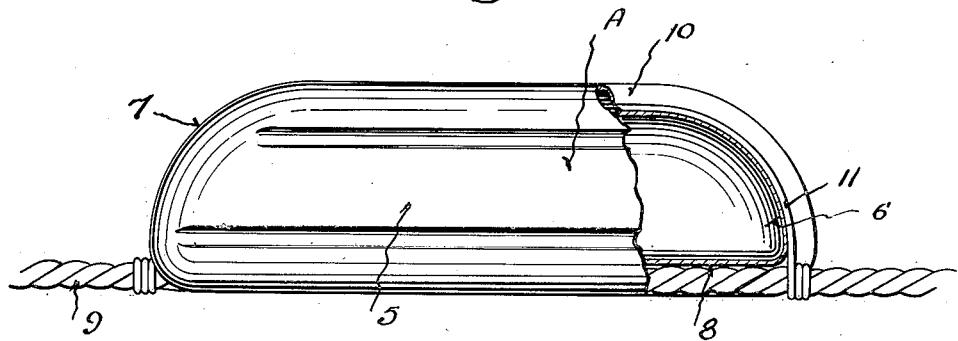
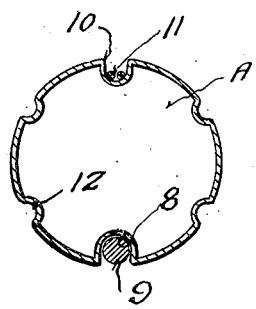
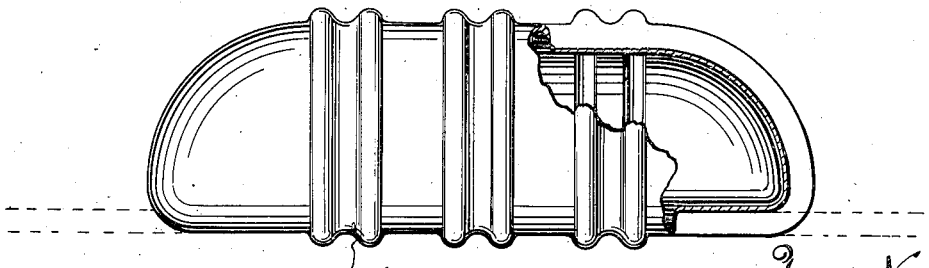
Inventors
Everett Lafond
Arthur J. Luebke Patented Apr. 30, 1935

1,999,702

UNITED STATES PATENT OFFICE 1,999,702

FISHING NET FLOAT

Everett Lafond and Arthur J. Luebke,
Two Rivers, Wis.

Application April 7, 1934, Serial No. 719,551

1 Claim. (Cl. 43—50)

This invention appertains to fishing and trapping, and more particularly to a novel float for fishing nets.

Considerable difficulty is experienced with the use of floats now on the market, in that the cords of the net tend to catch in the floats, and the nets often become torn thereby. It is therefore one of the salient objects of our invention to provide novel means for constructing the float, whereby the danger of the cords and other parts of the net becoming entangled with the floats is reduced to a minimum.

A further important object of our invention is to provide novel means for securing the float to the net, whereby twisting and turning of the float on the net is eliminated so that the floats will always be in proper position to prevent entangling thereof.

A still further object of our invention is to provide a metal float for fishing nets, having the outer ends constructed in such a manner that cords are thrown away from the float, the float being provided wtih a longitudinal groove for receiving the metering cord of the net, whereby twisting of the float relative to the metering cord is prevented.

A still further object of our invention is to provide an improved float for fishing nets of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:—

Figure 1 is a fragmentary side elevation of a float constructed in accordance with our invention, showing the method of attaching the same to the metering cord of a fishing net, parts of the float being shown broken away and in section to illustrate structural details thereof.

Figure 2 is a transverse section showing our improved float.

Figure 3 is a side elevation of a slightly modified form of our float, with parts thereof shown broken away and in section.

Referring to the drawing in detail, wherein similar reference characters designate corresponding parts throughout the several views, the letter A generally indicates our improved float, which is preferably, but not necessarily, formed of hollow aluminum 5. As shown, this body 5 is of a substantially cylindrical shape and has its opposite ends provided with rounded closure walls 6. These end walls 6 curve upwardly and inwardly, as at 7, away from the longitudinally extending groove 8, which is provided for the purpose of receiving the metering cord 9.

The body of the float, and the end walls 6 thereof, are also provided with a longitudinally extending groove 10, which can communicate with the ends of the groove 9. This groove 10 receives the tying or seaming cord 11 employed for lashing the float to the net. Thus, by this construction, twisting and turning of the float on the metering cord will be prevented, and hence the front curved terminals of the end walls 6 will always be adjacent to the metering cord. Thus, when parts of the net strike against the ends of the float, the same will be guided on top of the body of the float, and thus away from the same. This will effectively prevent the net from being caught between the metering cord and the float.

In order to strengthen the hollow metallic body, the same can be provided at spaced points with instruck grooves 12. In Figure 3 we have shown a slightly modified form of our float, and in this form the longitudinal strengthening ribs 12 are eliminated and we provide substantially annular convex or concave grooves 13 around the body portion of the float.

Changes in details may be made without departing from the spirit or scope of this invention, but what we claim as new is:—

The combination with a fishing net including a metering cord, of a float for the net comprising an elongated cylindrical body having a longitudinally extending groove in its lower face for receiving the metering cord, the body having arcuate end walls curving inwardly and upwardly away from the metering cord, the longitudinal groove opening out the lower ends of said end walls, said body also having a longitudinally extending groove in its upper face and end walls, and a tie cord received in said last mentioned grooves and secured to the metering cord.

EVERETT LAFOND.
ARTHUR J. LUEBKE.